United States Patent Office 2,971,986
Patented Feb. 14, 1961

2,971,986

METHOD OF PREPARATION OF p-ISOPROPYL-α-METHYL-BENZYL ALCOHOL

Frederick H. Norton, Concord, and Alice C. Young, Berkeley, Calif., assignors to The Dow Chemical Company, Midland, Mich., a corporation of Delaware No Drawing. Filed Feb. 24, 1958, Ser. No. 716,869

1 Claim. (Cl. 260—618)

This invention relates to the novel compound p-isopropyl-α-methyl-benzyl alcohol and a novel method whereby this compound is produced. The subject of this invention corresponds to the formula

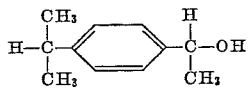

The new compound is a colorless liquid soluble in many common organic solvents such as alcohol, ether, benzene, and hydrocarbon liquids, and of very low solubility in water. The new compound is useful as an herbicide and is adapted to be employed in compositions for the control of wood- and paper-rot fungi.

The new compound may be prepared in a three-stage process which comprises (1) reacting a methyl magnesium halide and p-isopropyl benzaldehyde to obtain an intermediate condensation product, (2) hydrolyzing the intermediate condensation product, and (3) distilling the resulting mixture in the presence of activated alumina. In carrying out the first stage of the new process, a methyl magnesium halide is freshly prepared by reacting magnesium metal with a methyl halide in anhydrous diethyl ether as reaction medium. The methyl halide may be methyl chloride, methyl bromide, or preferably methyl iodide. The reaction may be carried out at the boiling temperature and under reflux.

Para-isopropyl-benzaldehyde is added to the methyl magnesium halide reaction mixture and the resulting mixture is heated to cause a reaction and obtain an aldehyde-methyl magnesium halide condensation product as intermediate.

In carrying out the second stage of the reaction, the intermediate condensation product in the reaction mixture wherein it is produced is poured over a mixture of ice and concentrated hydrochloric acid, the latter in stoichiometric excess. The chilled mixture separates into an acidic aqueous layer and an ethereal non-aqueous layer. The aqueous acidic layer is removed in a separatory funnel and extracted with diethyl ether. The ether extract is combined with the residual ethereal layer from the reaction mixture. The combined ether solution is washed successively with cold dilute hydrochloric acid, water, cold dilute aqueous alkali, and again with water. Thereafter, the ether solution is dried with anhydrous calcium chloride and anhydrous sodium sulfate, and then concentrated by gentle evaporation to remove part of the ether solvent at atmospheric pressure. In carrying out the third stage of the novel method, the concentrate ether solution resulting from the second stage is intimately mixed and stirred with a minor, catalytic amount of activated alumina of 8 to 14 mesh particle size. The resulting mixture is then subjected to distillation under reduced pressure and increasing temperatures. The desired p-isopropyl-α-methyl-benzyl alcohol product is recovered by distillation, e.g., at 4 millimeters pressure and a temperature range of from 101° to 104° C.

The following example illustrates the invention, but is not to be considered as limiting.

Example 1

Magnesium turnings (24 grams; 1.0 mole) were placed in a 2-liter flask fitted with reflux condenser, dropping funnel, and apparatus for stirring. Anhydrous diethyl ether was added to cover the magnesium. The actual amount is not critical provided the magnesium is covered. A solution was prepared consisting of methyl iodide, 142 grams, (1 mole) in 200 milliliters of diethyl ether. A small amount of this was added drop-wise to the magnesium turnings under ether to initiate reaction. Thereafter, more anhydrous ether was added to bring the total volume of reaction medium to approximately 400 milliliters. The remainder of the methyl iodide solution was then added drop-wise at a rate whereat the heat of reaction maintained the reaction at the boiling temperature. The mixture was then heated for ten minutes at the boiling temperature to complete the reaction and obtain a methyl magnesium iodide solution in diethyl ether reaction medium.

Para-isopropyl benzaldehyde (147 grams; 1 mole) dissolved in 200 milliliters of anhydrous diethyl ether was added drop-wise to the solution of methyl magnesium iodide in ether and the mixture was heated at the boiling temperature with stirring throughout the addition and subsequent reaction time. Upon completion of the addition the mixture was boiled under reflux for one-half hour to complete the reaction and to produce an intermediate condensation product of methyl magnesium iodide and para-isopropyl benzaldehyde.

Thereafter heating and stirring were discontinued and the reaction mixture was immediately poured over a mixture of ice and excess concentrated hydrochloric acid. The mixture divided into an acidic aqueous layer and a non-aqueous product solution layer. The acidic aqueous layer was separated, washed with diethyl ether, and the ether extract combined with the non-aqueous product solution layer. The combined non-aqueous layers were then successively washed with cold dilute hydrochloric acid with water, with very dilute aqueous sodium hydroxide, and finally with water. Thereafter the non-aqueous layer was dried successively with anhydrous calcium chloride and anhydrous sodium sulfate. A major proportion of diethyl ether reaction medium was removed from the non-aqueous solution by vaporization at atmospheric pressure, leaving product in the residue. The resulting residue was intimately mixed with one gram of activated alumina of 8 to 14 mesh particle size and the mixture was subjected to distillation at subatmospheric pressure. There was obtained as a distillate fraction, a p-isopropyl-α-methyl-benzyl alcohol product boiling in the range of 101° to 104° C. at 4 millimeters pressure and having an index of refraction $n/D$ of 1.5126 at 23.5° C. and specific gravity of 0.9617 as compared with water at 25° C.

The novel compound, p-isopropyl-α-methyl-benzyl alcohol, is useful as a selective herbicide for the control of undesired vegetation. For such use, the compound may be dispersed on an inert finely divided solid with or without the aid of a solvent or dispersant and employed as a dust. Also, such preparations may be dispersed in water with or without the aid of a wetting agent and the resulting aqueous suspension employed as a spray or wash. In other procedures, the product may be employed in oils, or as a constituent of oil-in-water or water-in-oil emulsions, or as aqueous dispersions thereof which may be applied by spray or drench. In a representative operation, an aqueous emulsion containing 6.66 ounces of p-isopropyl-α-methyl-benzyl alcohol as sole toxicant per hundred gallons of ultimate mixture gave 98 percent kill of seeds and emerging seedlings of canary grass when applied as a drench to the soil wherein they occurred; but a similar emulsion containing the same toxicant at the much higher concentration of 3.30 pounds per hundred gallons of ultimate mixture did not injure corn or tomatoes.

We claim:

A method of preparing p-isopropyl-$\alpha$-methylbenzyl alcohol which comprises (1) reacting a methyl magnesium halide and p-isopropylbenzaldehyde to obtain an intermediate condensation product, (2) hydroylzing the intermediate condensation product, and (3) distilling the resulting mixture under subatmospheric pressure and at increasing temperatures in the presence of at least a minor amount of activated alumina of from 8 to 14 mesh particle size.

References Cited in the file of this patent
UNITED STATES PATENTS

| | | |
|---|---|---|
| 2,491,926 | Lorand et al. | Dec. 20, 1949 |
| 2,723,261 | Levine et al. | Nov. 8, 1955 |
| 2,776,320 | Thompson | Jan. 1, 1957 |

OTHER REFERENCES

Braun et al.: Chem. Abstracts, vol. 20 (1927), pages 1460–61 (2 pages).

Parham et al.: Jour. Amer. Chem. Soc., vol. 76 (1954), page 5338, 1 page.